United States Patent
Liu et al.

(10) Patent No.: US 9,718,696 B2
(45) Date of Patent: Aug. 1, 2017

(54) LOW TEMPERATURE CO-FIRED CERAMIC MATERIAL AND PREPARATION METHOD THEREFOR

(71) Applicant: SHANGHAI INSTITUTE OF CERAMICS, CHINESE ACADEMY OF SCIENCES, Shanghai (CN)

(72) Inventors: Zhifu Liu, Shanghai (CN); Yongxiang Li, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 0 days.

(21) Appl. No.: 15/066,203

(22) Filed: Mar. 10, 2016

(65) Prior Publication Data
US 2016/0264470 A1 Sep. 15, 2016

(30) Foreign Application Priority Data
Mar. 12, 2015 (CN) .......................... 2015 1 0109370

(51) Int. Cl.
*C04B 35/622* (2006.01)
*C01B 33/24* (2006.01)
(Continued)

(52) U.S. Cl.
CPC .......... *C01B 33/24* (2013.01); *C04B 35/195* (2013.01); *C04B 35/22* (2013.01);
(Continued)

(58) Field of Classification Search
CPC ................ C04B 35/622; C04B 35/626; C04B 35/62605; C04B 35/62645; C04B 35/62675
See application file for complete search history.

(56) References Cited

U.S. PATENT DOCUMENTS 5,258,335 A 11/1993 Muralidhar et al.
8,101,536 B2 * 1/2012 Kim .................. C04B 35/01
501/135
(Continued)

FOREIGN PATENT DOCUMENTS

CN 101823880 A 9/2010

OTHER PUBLICATIONS

Udovic, M. et al., "Dielectric Characterisation of Ceramics from the TiO2—TeO2 System," Journal of the European Ceramic Society, vol. 21, No. 10-11, Sep. 2001, 4 pages.
(Continued)

*Primary Examiner* — Noah Wiese
(74) *Attorney, Agent, or Firm* — Alleman Hall Creasman & Tuttle LLP

(57) ABSTRACT

A low temperature co-fired ceramic powder has a chemical composition of $xR_2O\text{-}yR'O\text{-}zM_2O_3\text{-}wM'O_2$, wherein R is Li, Na and/or K, R' is Mg, Ca, Sr, Ba, Zn and/or Cu, M is B, Al, Ga, In, Bi, Nd, Sm, and/or La, M' is Si, Ge, Sn, Ti, and/or Zr, $x \geq 0$, $y \geq 0$, $z \geq 20\%$, $w \geq 15\%$, and $x+y+z+w=1$. The preparation method comprises: weighing constituent powders according to the composition of the ceramic powder, and uniformly mixing these powders as a raw material powder; and presintering the raw material powder in a muffle furnace followed by grinding, the presintering comprising gradiently heating the raw material powder to a maximum temperature of 950° C. by first rising to 350-450° C. and staying thereat for a period, then staying at intervals of 50-100° C. for a period.

12 Claims, 2 Drawing Sheets

(51) Int. Cl.
*C04B 35/195* (2006.01)
*C04B 35/22* (2006.01)
*C04B 35/626* (2006.01)

(52) U.S. Cl.
CPC .. *C04B 35/62665* (2013.01); *C04B 35/62675* (2013.01); *C04B 2235/3215* (2013.01); *C04B 2235/3409* (2013.01); *C04B 2235/5436* (2013.01); *C04B 2235/80* (2013.01)

(56) References Cited

U.S. PATENT DOCUMENTS 8,231,961 B2 * 7/2012 Yokoyama .............. B32B 18/00
156/89.11
8,652,982 B2 * 2/2014 Motoya ................. C04B 35/195
501/128

OTHER PUBLICATIONS

Bian, J. et al., "Designing of Glass-Free LTCC Microwave Ceramic—Ca1-x(Li0.5Nd0.5)xWO4 by Crystal Chemistry," Journal of the American Ceramic Society, vol. 95, No. 1, Aug. 31, 2011, 6 pages.

Thomas, D. et al., "Casting and Characterization of LiMgPO4 Glass Free Ltcc Tape for Microwave Applications," Journal of the European Ceramic Society, vol. 33, No. 1, Jan. 2013, Available Online Aug. 22, 2012, 7 pages.

* cited by examiner

LOW TEMPERATURE CO-FIRED CERAMIC MATERIAL AND PREPARATION METHOD THEREFOR

FIELD OF THE INVENTION

The present invention relates to the field of a low temperature co-fired ceramic material and a preparation method therefor, particularly to a method for preparing a glass-phase-free low temperature co-fired ceramic material of a high quality factor by all solid-state synthesis, and a low dielectric loss multi-component low temperature co-fired ceramic material prepared therefrom.

BACKGROUND OF THE INVENTION

Low temperature co-fired ceramics (LTCC) is one of the core technologies for passive integration and package-interconnection, in which low-temperature fired ceramic powder is made into a green tape, then a required circuit pattern is formed on the green tape by drilling, micropore grouting, electrode printing, etc., and various passive components (such as capacitors, resistors, filters, couplers, etc.) are embedded in a multilayer ceramic substrate, laminated together, and sintered below 950° C., to give a three-dimensional high-density circuit or a three-dimensional circuit substrate with built-in passive components, and IC and active devices are mounted on the surface of the three-dimensional circuit substrate to give a passive/active integrated functional module which is especially suitable for a subassembly for high-frequency communications. Because of its excellent electrical, mechanical, thermal, and process characteristics, LTCC has become a core technology for miniaturization, integration, and modularization of electronic components, and been widely used in the areas of aviation, aerospace, military, automotive electronics, wireless communications, etc.

With the development of next-generation mobile communications, satellite navigation and positioning systems, intelligent networks, and unmanned aerial vehicles, mass-data high-speed wireless transmission of information is the development trend of the future. Therefore, the new generation of LTCC passive components must meet the requirements of high-frequency, broad-band, and low-loss. LTCC materials are the basis of the application of LTCC technology. In order to develop a new generation of LTCC passive components, an LTCC microwave dielectric material which can be used at a frequency above 30 GHz or even above 100 GHz is needed.

Glass ceramics, and glass-ceramics are the most typical composition systems of LTCC material. It is often necessary to introduce a glass phase to achieve low-temperature sintering; however, the disordered structure of the glass phase leads to a great intrinsic loss of the LTCC material. Therefore, material researchers have been exploring the problem of how to maintain good microwave dielectric properties while achieving low-temperature sintering.

Many researchers hope to develop glass-phase-free LTCC microwave dielectric materials based on crystalline compounds of low melting points, such as molybdate (CN201010192027), tungstate (Journal of the American Ceramic Society, V95, No. 1, p. 318-23, 2012), tellurite (Journal of the European Ceramic Society, V21, p. 1735-1738, 2001), phosphate (Journal of the European Ceramic Society, V33, No. 1, p. 87-93, 2013), etc. Although these single-phase crystalline compounds exhibit excellent microwave dielectric and sintering properties, because the properties of the materials are determined by their intrinsic characteristics, it is difficult for the materials to match other materials to form a co-adapted material system, and thus there is still a long way to go before practical application can be made thereof.

U.S. Pat. No. 5,258,335 and related patents provide a high performance glass ceramic based LTCC microwave dielectric material with a dielectric constant of less than 7.8 and a dielectric loss of less than $10^{-3}$ which is obtained by firing $CaO\text{---}B_2O_3\text{---}SiO_2$ glass at around 900° C. for crystallization, and a Ferro A6M material developed therefrom can be used at a frequency range of 10 GHz to 100 GHz. However, in the methods of these patents, the material is crystallized by controlling the sintering temperature. Therefore, the properties of the material, which are highly related to the type and content of the crystalline phase, are very sensitive to the sintering process parameters.

The method for preparing a glass ceramic comprises: melting raw materials at a high temperature, rapidly cooling the melt by water quenching or the like to get a glass phase, crystallizing the glass phase by heat treatment at a temperature to form compounds having fine crystal grains, thus obtaining a glass ceramic with microcrystal phases dispersed in the glass phase wherein the type and content of the microcrystal phase compounds have a decisive impact on the performance of the glass ceramic. A glass ceramic is generally composed of elements that can form crystalline phase compounds. Therefore, it is possible to obtain a crystalline phase by direct solid-state synthesis. However, there has not been a report of obtaining an excellent performance LTCC ceramic material by direct solid-state synthesis.

SUMMARY OF THE INVENTION

The present invention aims to overcome the deficiency that an excellent performance LTCC ceramic material cannot be obtained by direct solid-state synthesis in the prior art, and provides an LTCC ceramic material and a preparation method therefor.

The present invention provides a preparation method for an LTCC ceramic powder which has a chemical composition of $xR_2O\text{-}yR'\text{-}zM_2O_3\text{-}wM'O_2$, wherein R is selected from at least one of Li, Na, and K, R' is selected from at least one of Mg, Ca, Sr, Ba, Zn, and Cu, M is selected from at least one of B, Al, Ga, In, Bi, Nd, Sm, and La, M' is selected from at least one of Si, Ge, Sn, Ti, and Zr, x, y, z, and w represent weight percentages, $x \geq 0$, $y \geq 0$, $z \geq 20\%$, $w \geq 15\%$, and $x+y+z+w=1$, the preparation method comprising the steps of:

1) weighing $R_2O$ powder, R'O powder, $M_2O_3$ powder, and $M'O_2$ powder according to the composition of the LTCC ceramic powder, and uniformly mixing these powders as a raw material powder; and 2) presintering the raw material powder in a muffle furnace followed by grinding to give the LTCC ceramic powder, the presintering comprising gradiently heating the raw material powder to a maximum temperature of not higher than 1000° C., during which a furnace temperature first rises to 350-450° C. and stays thereat for a period, then, as the temperature rises, stays at each interval of 50-100° C. thereabove for a period.

Preferably, where R is selected from at least one of alkali metals Li, Na, and K, R' is selected from at least one of Mg, Ca, Ba, Zn, and Cu, M includes at least one of B and Bi, and at least one of Al, Ga, Nd, Sm, and La, M' is selected from at least one of Si, Ge, Sn, Ti, and Zr, $x \geq 0$, $y \geq 0$, $z \geq 40\%$, and $w \geq 15\%$, the LTCC ceramic powder is a low softening point multi-component crystalline phase material having a melting point lower than 850° C., preferably lower than or equal to 750° C.

Preferably, where R is selected from at least one of alkali metals Li, Na, and K, R' is selected from at least one of Mg, Ca, Sr, Ba, Zn, and Cu, M is selected from at least one of B, Al, Bi, Nd, Sm, and La, M' is selected from at least one of Si, Ge, Sn, Ti, and Zr, x≥0, y≥0, 40%>z≥20%, and w≥20%, the LTCC ceramic powder is a high softening point multi-component crystalline phase material having a melting point higher than or equal to 850° C., preferably higher than or equal to 950° C.

Preferably, in step 2), each period is 1-4 hours, and a heating rate is 2-8° C./min, preferably 5° C./min.

Preferably, in step 2), the presintering comprises gradiently heating the raw material powder to a maximum temperature of not higher than 950° C., during which the furnace temperature first rises to 400° C. and stays thereat for 2-3 hours, then, as the temperature rises, stays at each interval of 50° C. thereabove for 2-3 hours.

Preferably, the LTCC ceramic powder has a particle size of 0.5-3 μm.

The present invention further provides an LTCC ceramic material, which is obtained by sintering the LTCC ceramic powder prepared by the above-mentioned method, preferably at 750° C.-950° C.

In another aspect, the present invention further provides an LTCC composite ceramic material, which is obtained by sintering an LTCC composite ceramic powder consisting of at least one low softening point multi-component crystalline phase material prepared by the above-mentioned method and at least one high softening point multi-component crystalline phase material prepared by the above-mentioned method, the content of the low softening point multi-component crystalline phase material in the LTCC composite ceramic powder being less than 20 wt %.

Preferably, the LTCC composite ceramic material is obtained by sintering the LTCC composite ceramic powder at 850° C.-950° C., preferably 850° C.-920° C.

Preferably, the content of the low softening point multi-component crystalline phase material in the LTCC composite ceramic powder is less than 15 wt %.

Advantageous Effects of the Present Invention

The present invention gives a method of preparing a high quality multi-component LTCC microwave dielectric material through an all solid-state synthesis process. Raw materials which can form a glass ceramic are presintered by undergoing multi-step solid-state reactions to synthesize a multi-component crystalline phase ceramic material, the comprehensive performance of which such as crystalline phase composite, final softening point, sintering temperature, and microwave dielectric properties can be controlled by adjusting the composite and ratio of the raw materials. The material prepared by the method provided herein has an advantage that the comprehensive performance such as microwave dielectric properties, sintering process system, and mechanical and chemical stability are easily controllable, because the material consists of multiple components and multiple phases.

DETAILED DESCRIPTION OF THE EMBODIMENTS

Figure 1:
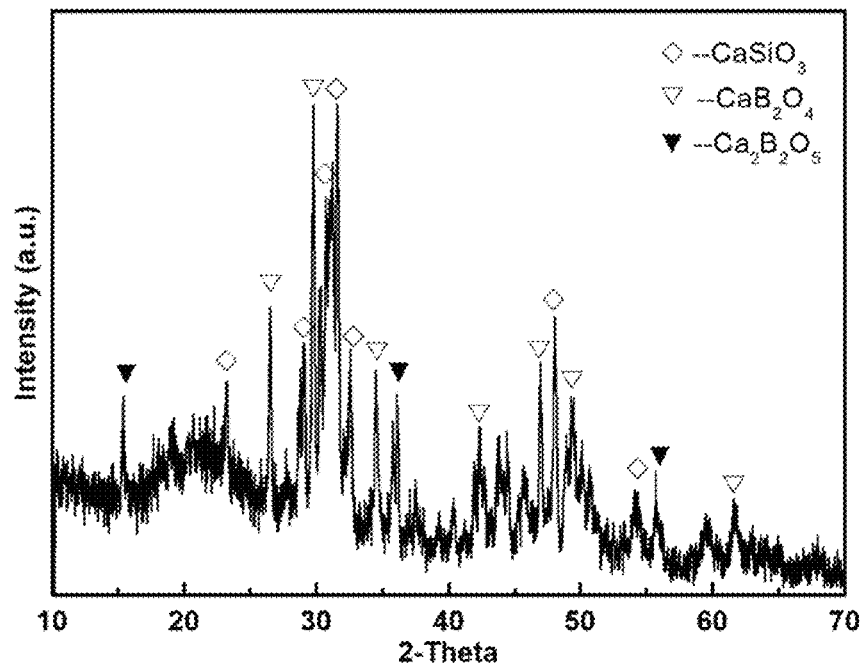
FIG. 1 is an X-Ray diffraction (XRD) pattern of the LTCC ceramic powder obtained by multi-step presintering in Example 1.

The present invention will be further described with the following embodiments below with reference to the drawings. It should be understood that the drawings and the following embodiments are only used for explaining this invention, and do not limit this invention.

The present invention relates to the field of low temperature co-fired ceramic material and preparation method therefor, particularly to a method for preparing a glass-phase-free low temperature co-fired ceramic material of a high quality factor by all solid-state synthesis, and a low dielectric loss multi-component low temperature co-fired ceramic material prepared therefrom.

The present invention gives a method of preparing a high quality multi-component LTCC microwave dielectric material through an all solid-state synthesis process. Raw materials which can form a glass ceramic are presintered with undergoing multi-step solid-state reactions to synthesize a multi-component crystalline phase ceramic material, the comprehensive performance of which such as crystalline phase composite, final softening point, sintering temperature, microwave dielectric properties can be controlled by adjusting the composite and ratio of the raw materials. The material prepared by the method provided herein has an advantage that the comprehensive performance such as microwave dielectric properties, sintering process system, mechanical and chemical stability are easily controllable, because the material consists of multiple components and multiple phases.

The material of the present invention has a chemical composition of $xR_2O-yR'O-zM_2O_3-wM'O_2$, wherein R is selected from one or more of alkali metals Li, Na and K, R' is selected from one or more of Mg, Ca, Sr, Ba, Zn, and Cu, M is selected from one or more of B, Al, Ga, In, Bi, Nd, Sm, and La, M' is selected from one or more of Si, Ge, Sn, Ti, and Zr, x, y, z, and w represent weight percentages, x≥0, y≥0, z≥20%, w≥15%, and x+y+z+w=1. The composition of the material can be optimized depending on the required softening point and dielectric constant of the material.

For a low softening point multi-component crystalline phase material, it has a composite of $xR_2O-yR'O-zM_2O_3-wM'O_2$, wherein R is selected from one or more of alkali metals Li, Na, and K, R' is selected from one or more of Mg, Ca, Ba, Zn, and Cu, M is a combination of one or more of B and Bi, and one or more of Al, Ga, Nd, Sm, and La, M' is selected from one or more of Si, Ge, Sn, Ti, and Zr, x, y, z, and w represent weight percentages, x≥0, y≥0, z≥40%, w≥15%, and x+y+z+w=1.

For a high softening point multi-component crystalline phase material, it has a composite of $xR_2O-yR'O-zM_2O_3-wM'O_2$, wherein R is selected from one or more of alkali metals Li, Na and K, R' is selected from one or more of Mg, Ca, Sr, Ba, Zn, and Cu, M is selected from one or more of B, Al, Bi, Nd, Sm, and La, M' is selected from one or more of Si, Ge, Sn, Ti, and Zr, x, y, z, and w represent weight percentages, x≥0, y≥0, z≥20%, w≥20%, and x+y+z+w=1.

The present invention provides a method for preparing a low temperature co-fired ceramic material through multi-step solid-sate reactions, the method comprising: mixing multi-component raw materials, and presintering the resulting mixture, in the process of presintering, when the temperature rises to a certain temperature, the mixture is kept at this temperature for a period, then kept for a period at specified temperature intervals so as to facilitate the formation of phases, the final persintering temperature is lower than the melting temperature of the multi-component material.

Raw materials are weighed according to stoichiometry, placed in a nylon ball mill jar without any liquid solvent for dry milling for 12 hours, then, the uniformly mixed powder raw materials are separated from the zirconia milling media.

The uniformly mixed raw materials are put into an alumina crucible with a cover, then placed in a muffle furnace for high temperature pre-synthesis reaction. The temperature of the muffle furnace rises at a rate of 5° C./min, and stays at a specified temperature for a period such that the raw materials react. The first holding temperature is 350-450° C., then as the temperature rises, a holding point is set up at each interval of 50-100° C. thereabove, the holding duration at every holding temperature is 1-4 hours, the maximum presintering temperature is not higher than 1000° C.

A further optimized presintering condition includes: the first holding temperature is 400° C., then as the temperature rises, a holding point is set up at intervals of 50-100° C., the holding duration at every holding temperature is 2-3 hours, the maximum presintering temperature is not higher than 950° C.

The resulting material after the multi-step process is subjected to crushing and ball milling to give a crystallized multi-component composite-phase ceramic powder. The resulting ceramic powder is finely ground to a particle size of 0.5-3 µm so as to serve as a raw material for preparing a high quality LTCC microwave dielectric ceramic.

Two or more ceramic powders obtained by the above-mentioned method are mixed according to the stoichiometric ratio to prepare an LTCC material, the ceramic powders used containing at least one low softening point multi-component ceramic powder and one or more high softening point multi-component ceramic powder.

Said low softening point multi-component ceramic powder has a softening point lower than 850° C., said high softening point multi-component ceramic powder has a softening point higher than 850° C. Preferably, the low softening point multi-component ceramic powder has a softening point lower than 800° C., the high softening point multi-component ceramic powder has a softening point higher than 900° C.

The content of the low softening point multi-component crystalline phase material in the multi-component crystalline phase LTCC material is less than 20 wt %, the sintering temperature of the composited LTCC material is not higher than 950° C. Preferably, the content of the low softening point multi-component crystalline phase material is less than 15 wt %, the sintering temperature of the composited LTCC material is not higher than 920° C. The resulting LTCC material has a good co-firing compatibility with silver electrodes.

Hereinafter, the present invention will be better described with the following representative examples. It is understood that the following examples are only used to explain this invention and do not limit the scope of this invention, and any non-essential improvements and modifications made by a person skilled in the art based on this invention all fall into the protection scope of this invention. The specific parameters below are only exemplary, and a person skilled in the art can choose proper values within an appropriate range according to the description of this article, and are not restricted to the specific values cited below.

EXAMPLE 1

Where R'=Ca, M=B, M'=Si, x=0, y=42%, z=26%, and w=32%, the composite of the material can be expressed as 42% CaO-26% $B_2O_3$-32% $SiO_2$ (referred to as CBS). Raw materials of $CaCO_3$, $B_2O_3$, and fused silica are weighed stoichiometrically and placed in a nylon ball mill jar without any liquid solvent for dry milling for 12 hours to be uniformly mixed. The mixed raw materials are put into an alumina crucible in a muffle furnace for presintering treatment, during which the temperature of muffle furnace rises at a rate of 5° C./min, and stays at 400° C. for 2 hours, then stays at each interval of 50° C. thereabove for 2 hours, and finally rises to 900° C. and stays thereat for 2 hours followed by natural cooling. The presinterd material is crushed, ball-milled, and finely ground to give a ceramic powder with intact crystalline phase. X-ray diffraction (XRD) analysis shows that the ceramic powder mainly contains phase compositions of $CaSiO_3$, $CaB_2O_4$, and $Ca_2B_2O_5$ (the XRD pattern is shown in FIG. 1).

Figure 2:
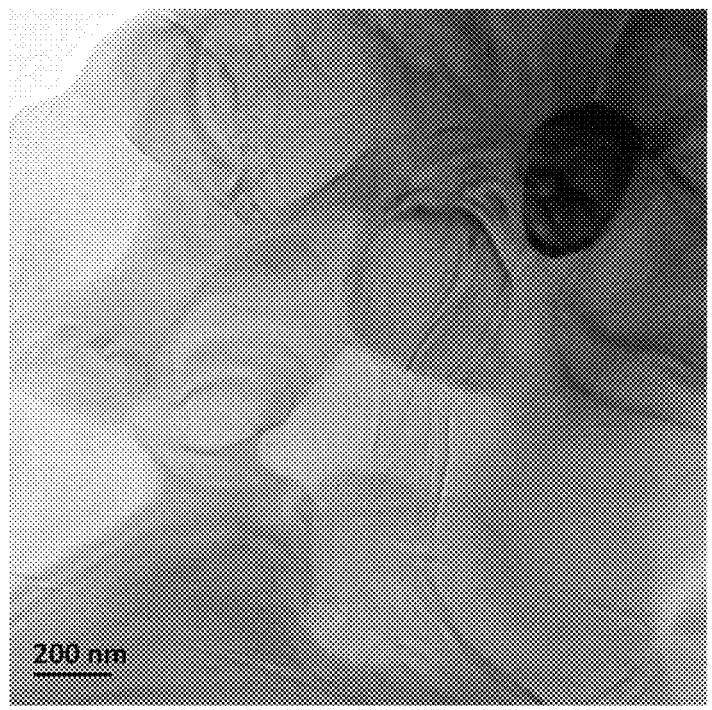
FIG. 2 is a transmission electron microscopy (TEM) image of the ceramic obtained by low temperature sintering the LTCC ceramic powder prepared in Example 1.

A PVA binder is added to the multi-phase ceramic powder as a raw material, and the resulting mixture is granulated and shaped to give a cylindrical green body, which is then debinded at 450° C. and sintered at 950° C. for 2 hours to give a sintering densified ceramic sample, which has a dielectric constant of 6.15 (@ 13.18 GHz), a dielectric loss of $4.4 \times 10^{-4}$, and a quality factor (Q·f) of ~30000 GHz, thus having excellent microwave dielectric properties as indicated by tests of microwave dielectric properties. The microstructure of the ceramic sample is observed under a transmission electron microscope. FIG. 2 is the TEM image showing that there is no glass phase in this low temperature firing ceramic material.

COMPARATIVE EXAMPLE 1

Where R'=Ca, M=B, M'=Si, x=0, y=48%, z=16%, and w=36%, the composite of the material can be expressed as 48% CaO-16% $B_2O_3$-36% $SiO_2$ (referred to as CBS). Raw materials of $CaCO_3$, $B_2O_3$, and fused silica are weighed stoichiometrically and placed in a nylon ball mill jar without any liquid solvent for dry milling for 12 hours to be uniformly mixed. The mixed raw materials are put into an alumina crucible in a muffle furnace for presintering treatment, during which the temperature of muffle furnace rises at a rate of 5° C./min to 900° C. and stays thereat for 2 hours followed by natural cooling. The presintered material is crushed, ball-milled, and finely ground to give a ceramic powder with intact crystalline phase. X-ray diffraction (XRD) analysis shows that the ceramic powder mainly contains phase compositions of $CaSiO_3$, $CaB_2O_4$ and $Ca_2B_2O_5$;

A PVA binder is added to the ceramic powder as a raw material, and the resulting mixture is granulated and shaped to give a cylindrical green body, which is then debinded at 450° C. and sintered at 950° C. for 2 hours to give a sintering densified ceramic sample, which has a dielectric constant of 5.62 (@14.49 GHz), a dielectric loss of $4.7 \times 10^{-4}$, and a quality factor (Q·f) of ~31500 GHz as indicated by tests of microwave dielectric properties.

EXAMPLE 2

In this example, R'=Ba, M=B and Al, M'=Si, and the composite of the material is 25% BaO-40% $B_2O_3$-10%

Figure 3:
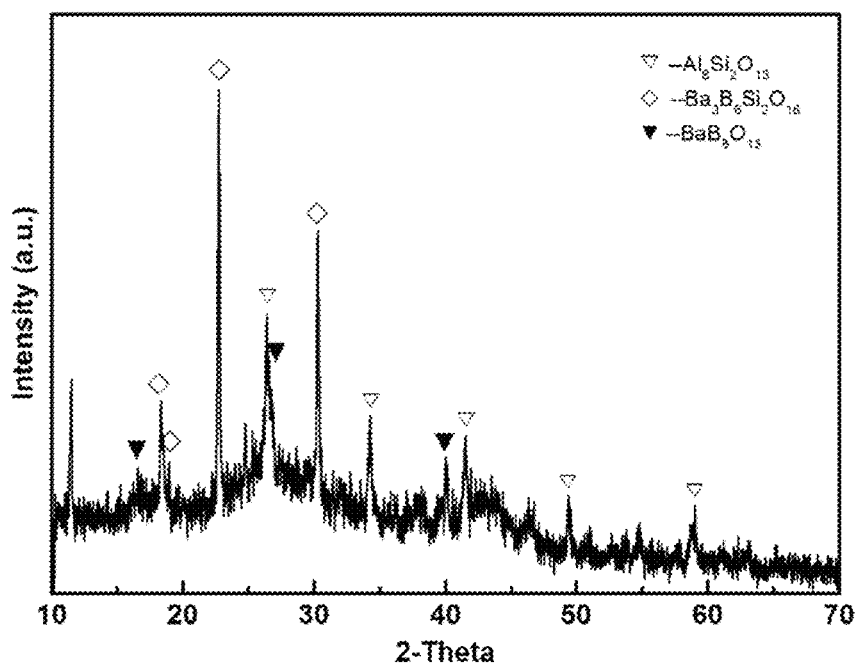
FIG. 3 is an X-Ray diffraction (XRD) pattern of the LTCC ceramic powder obtained by multi-step presintering in Example 2.

$Al_2O_3$-25% $SiO_2$ (referred to as BBAS). Raw materials of $BaCO_3$, $B_2O_3$, $Al_2O_3$, and fused silica are weighed stoichiometrically and placed in a nylon ball mill jar without any liquid solvent for dry milling for 12 hours to be uniformly mixed. The mixed raw materials are put into an alumina crucible in a muffle furnace for presintering treatment, during which the temperature of muffle furnace rises at a rate of 5° C./min, and stays at 400° C. for 2 hours, then stays at each interval of 50° C. thereabove for 2 hours, and finally rises to 750° C. and stays thereat for 2 hours followed by natural cooling. The presintered material is crushed, ball-milled, and finely ground to give a ceramic powder with intact crystalline phase. X-ray diffraction (XRD) analysis shows that the ceramic powder mainly contains phase compositions of $Al_6Si_2O_{13}$, $BaB_8O_{13}$, $Ba_3B_6Si_2O_{16}$, etc. (the XRD pattern is shown in FIG. 3).

EXAMPLE 3

The CBS ceramic powder synthesized in Example 1 and the BBAS ceramic powder synthesized in Example 2 are weighed at a ratio of 10:1, uniformly mixed by ball milling, and made into a ceramic sample by the sample-preparing process above, thus a dense ceramic sample is obtained by debinding at 450° C. and sintering at 950° C. for 2 hours, which has a dielectric constant of 5.85 (@13.22 GHz), a dielectric loss of $1.097 \times 10^{-3}$, and a quality factor (Q·f) of 12000 GHz as indicated by tests of microwave dielectric properties. The material has a good co-firing compatibility with silver electrodes, and can be used for preparing an LTCC package substrate.

COMPARATIVE EXAMPLE 2

The CBS ceramic powder synthesized in Comparative Example 1 and the BBAS ceramic powder synthesized in Example 2 are weighed at a ratio of 10:1, uniformly mixed by ball milling, and made into a ceramic sample by the sample-preparing process above, thus a dense ceramic sample is obtained by debinding at 450° C. and sintering at 950° C. for 2 hours, which has a dielectric constant of 5.45 (@14.15 GHz), a dielectric loss of $1.26 \times 10^{-3}$, and a quality factor (Q·f) of ~11230 GHz as indicated by tests of microwave dielectric properties.

The invention claimed is:

1. A preparation method for a low temperature co-fired ceramic powder, the preparation method comprising the steps of:
   1) weighing $R_2O$ powder, R'O powder, $M_2O_3$ powder, and $M'O_2$ powder according to a chemical composition of the low temperature co-fired ceramic powder, and uniformly mixing these powders as a raw material powder; and
   2) presintering the raw material powder in a muffle furnace followed by grinding to give the low temperature co-fired ceramic powder, the presintering comprising gradiently heating the raw material powder to a maximum temperature of not higher than 950° C., during which a furnace temperature first rises to 350-450° C. and stays thereat for a period, then, as the temperature rises, stays at each interval of 50-100° C. thereabove for a period, wherein
   the low temperature co-fired ceramic powder has the chemical composition of $xR_2O$-$yR'O$-$zM_2O_3$-$wM'O_2$, wherein R is selected from at least one of alkali metals Li, Na, and K, R' is selected from at least one of Mg, Ca, Ba, Zn, and Cu, M includes at least one of B and Bi, and at least one of Al, Ga, In, Nd, Sm, and La, M' is selected from at least one of Si, Ge, Sn, Ti, and Zr, x, y, z, and w represent weight percentages, $x \geq 0$, $y \geq 0$, $z \geq 40\%$, $w \geq 15\%$, and $x+y+z+w=1$; and
   the low temperature co-fired ceramic powder is a low softening point multi-component crystalline phase material having a melting point lower than 850° C.

2. The preparation method according to claim 1, wherein the low softening point multi-component crystalline phase material has a melting point lower than or equal to 750° C.

3. The preparation method according to claim 1, characterized in that in step 2), each period is 1-4 hours, and a heating rate is 2-8° C./min.

4. The preparation method according to claim 1, characterized in that in step 2), each period is 1-4 hours, and a heating rate is 5° C./min.

5. The preparation method according to claim 1, characterized in that in step 2), the presintering comprises gradiently heating the raw material powder to a maximum temperature of not higher than 950° C., during which the furnace temperature first rises to 400° C. and stays thereat for 2-3 hours, then, as the temperature rises, stays at each interval of 50° C. thereabove for 2-3 hours.

6. The preparation method according to claim 1, characterized in that the ceramic powder has a particle size of 0.5-3 μm.

7. A low temperature co-fired ceramic material, the low temperature co-fired ceramic material being obtained by sintering the low temperature co-fired ceramic powder prepared by a method according to claim 1.

8. The low temperature co-fired ceramic material of claim 7, obtained by sintering at 750° C.-950° C.

9. A low temperature co-fired composite ceramic material, the low temperature co-fired composite ceramic material being obtained by sintering a low temperature co-fired composite ceramic powder consisting of:
   at least one low temperature co-fired ceramic powder prepared by the method according to claim 1 as a low softening point multi-component crystalline phase material, characterized in that R is selected from at least one of alkali metals Li, Na, and K, R' is selected from at least one of Mg, Ca, Ba, Zn, and Cu, M includes at least one of B and Bi, and at least one of Al, Ga, Nd, Sm, and La, M' is selected from at least one of Si, Ge, Sn, Ti, and Zr, $x \geq 0$, $y \geq 0$, $z \geq 40\%$, and $w \geq 15\%$, and the low softening point multi-component crystalline phase material having a melting point lower than 850° C.; and
   at least one high softening point multi-component crystalline phase material with the chemical composition of $xR_2O$-$yR'O$-$zM_2O_3$-$wM'O_2$, wherein R is selected from at least one of alkali metals Li, Na, and K, R' is selected from at least one of Mg, Ca, Sr, Ba, Zn, and Cu, M is selected from at least one of B, Al, Bi, Nd, Sm, and La, M' is selected from at least one of Si, Ge, Sn, Ti, and Zr, $x \geq 0$, $y \geq 0$, $40\% > z \geq 20\%$, and $w \geq 20\%$, and the high softening point multi-component crystalline phase material having a melting point higher than or equal to 850° C.; wherein
   the content of the low softening point multi-component crystalline phase material in the low temperature co-fired composite ceramic powder is less than 20 wt %.

10. The low temperature co-fired composite ceramic material according to claim 9, characterized in that the low temperature co-fired composite ceramic material is obtained by sintering the low temperature co-fired composite ceramic powder at 850° C.-950° C.

11. The low temperature co-fired composite ceramic material according to claim 10, wherein the low temperature co-fired composite ceramic material is obtained by sintering the low temperature co-fired composite ceramic powder at 850° C.-920° C.

12. The low temperature co-fired composite ceramic material according to claim 9, characterized in that the content of the low softening point multi-component crystalline phase material in the low temperature co-fired composite ceramic powder is less than 15 wt %.

* * * * *